Dec. 22, 1959  E. E. VAN HAM  2,917,923
LIQUID LEVEL GAUGE FOR HIGH PRESSURE BOILERS
Filed March 14, 1956
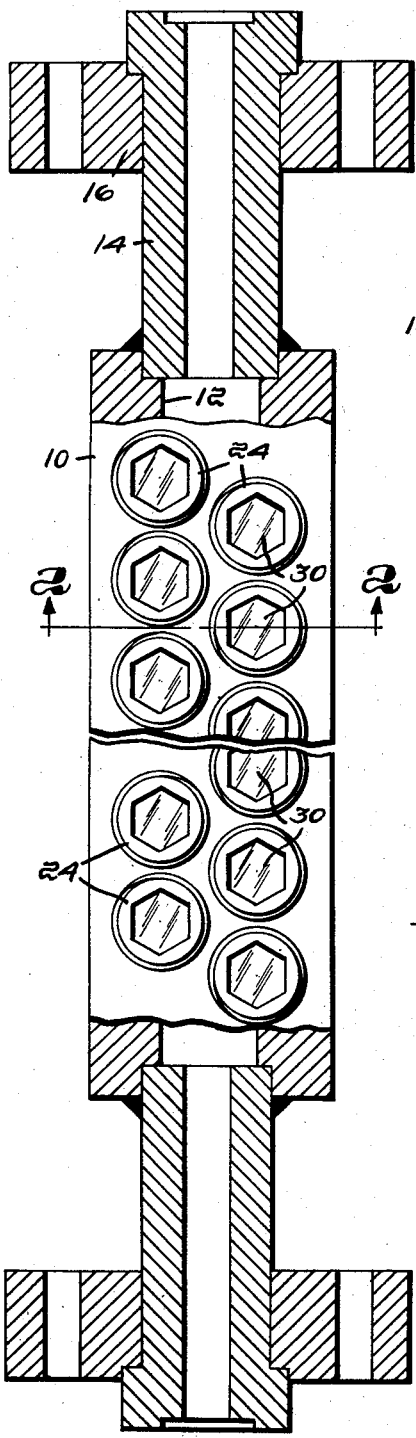
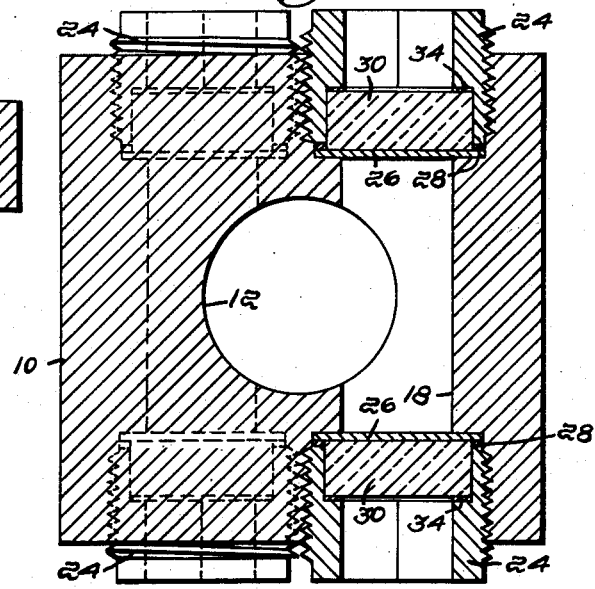
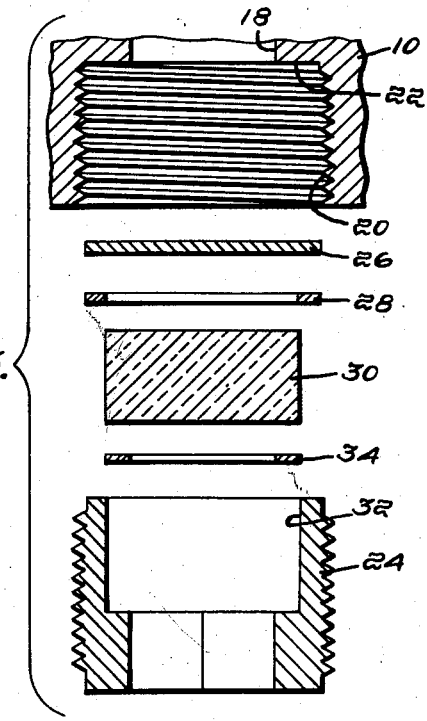
Inventor:
Ernest E. van Ham United States Patent Office 2,917,923
Patented Dec. 22, 1959

2,917,923

LIQUID LEVEL GAUGE FOR HIGH PRESSURE BOILERS

Ernest E. Van Ham, Somerville, Mass., assignor to Jerguson Gage & Valve Co., Somerville, Mass., a corporation of Massachusetts Application March 14, 1956, Serial No. 571,417

5 Claims. (Cl. 73—331)

This invention relates to a liquid level gauge for use with liquid containers under high internal pressure such as high pressure steam boilers, which will be more durable and lasting in use than gauges as now known and obviate expensive replacements of glass and mica, inevitable with such gauges. As the major contemplated field of use is with steam boilers I shall for clearness refer to steam boilers specifically as exemplifying such containers.

The so-called gauge glass consisting of a cylindrical glass tube, the ends of which are connected respectively to points above and below the normal range of liquid levels in a container, is well known. However, its strength is quite inadequate to withstand what today is considered only a moderate pressure. It has been customary to provide gauges consisting of a heavy body of steel provided with a groove or slot which receives the liquid column and is closed on one or both sides, as the case may be, with a flat plate or plates of heavy glass secured by a frame or frames bolted in position. There is great difficulty in maintaining a tightly sealed joint between the glass and the body. The glass is rapidly eroded on its interior surface, although this may be somewhat alleviated by using a covering strip of mica.

The disadvantages of the structure are accentuated under the heavy pressure conditions encountered in modern steam practice. The pressures of the present day tax the strength of such bodies. The glasses are fragile and expensive. Substantial pressure which a glass is not adapted to withstand has to be exerted thereon to secure a tight joint. Gasketing a rectangular opening is not easy. Under strain the gasket tends to move in the long straight portions thereof, and once it has been deformed so that leakage occurs, it can no longer be used. It is difficult to place a uniform clamping pressure on the glass, and uneven pressure is likely to cause cracking. The mica also has a limited life. Very high grade mica is required and, especially in large pieces, it is expensive. The traverse of boiler water and steam over the same, particularly when the boiler is blown down, is likely to cause delamination of the mica and destroy it. The replacement of mica and glass, or either one of them, is a relatively frequent requirement and a job which it is not easy to perform efficiently. Unless it is perfectly done renewed trouble is sure to develop promptly.

In accordance with the present invention, a gauge is provided which has a bore to receive the water column, the walls defining the bore being broken by a series of transverse bores having closures in the form of small mica-protected glass elements (bull's-eyes) to provide for inspection of the water column. In the construction contemplated the glasses are not subject to pressures except the internal pressure of the boiler, and require no gasketing in the ordinary sense of the word, and are protected by small, and therefore inexpensive, discs of mica which, because of the small area involved and their disposition in a circle, are of adequate strength to seal the joints at the margins of the glass element. The parts are relatively inexpensive. The assembly of the closures and the renewal or replacement of the parts is simple. In the preferred form to be described, the mica is located in a position offset from the bore which contains the water column and action of the water and steam on the mica is minimized.

The invention will be well understood by reference to the following description of an illustrative embodiment thereof shown by way of example in the accompanying drawings wherein:

Fig. 1 is a front elevation of a gauge;

Fig. 2 is a transverse section on line 2—2 of Fig. 1 on a larger scale; and

Fig. 3 is an exploded view showing a portion of the gauge body and the component parts of one of the closures all in section.

Referring now to Figs. 1 and 2 of the drawings, the gauge there shown comprises a body 10 consisting of a substantial block of steel having a central longitudinal bore 12, provision being made at the outer ends of the bore as by the welded-on nipples 14 and joint-making flanges 16, for connecting the ends of the bore through the boiler wall to the steam and water containing spaces of the boiler respectively.

To provide for inspection of the water column in the bore 12 the body of the gauge is pierced by at least one vertical row of transverse bores 18 which intersect the vertical bore 12, so that when a level of water stands in the latter in line with one of the transverse bores 18, it may be observed through such transverse bore, the exposed end of the bore being fitted with a suitable transparent closure, as will be described. As seen in Fig. 1, there may be two rows of these openings which are staggered to provide a substantially continuous view of the column throughout the height of the gauge and, as seen in Fig. 2, each bore 18 may pass entirely through the body, being provided with a closure at each end permitting illumination of the level by transmitted light and observation from either side. In any instance the bores 18 are preferably laterally offset from the center line of the longitudinal bore 12 and in the preferred form shown, as seen in Fig. 2, the axis of the transverse bore may be substantially tangent to the periphery of the bore 12. This will be referred to later.

The outer end of each of the bores 18 is provided with a threaded counterbore 20, defining a shoulder 22, and the mica-protected glass is secured in this counterbore by a threaded sleeve 24 screwing into the same.

In Fig. 3 various parts are shown separated, but in alignment, and it will be convenient to describe them in terms of assembling them to provide the arrangement shown in Fig. 2. Against shoulder 22 of the counterbore is placed a thin circular disc 26 of mica, which rests on that shoulder and bridges over the bore 18. Preferably, a narrow washer 28 of hard metal is superposed on the mica and provides the bearing surface against which the sleeve 24 screws. Received within the opening of the washer, and resting against the mica 26 is a cylindrical piece of glass 30, the diameter of which is intermediate between the diameters of the bore 18 and the counterbore 20. This glass is received in a rabbet 32 in the end of the sleeve 24. The glass is of a diameter to fit freely in the rabbet, by which is meant a rather nice fit without large interstices at the margins, but not a binding fit. The depth of the rabbet is such that the glass substantially fills the same and, when the washer 28 is used, projects a distance corresponding to the thickness of the washer, so that the mica disc is flat against its inner surface. There is here shown a thin washer 34 overlying the annular shoulder of the sleeve 24 for the glass to rest against to prevent its direct contact with the metal. The washer 34 however is not as shown intended as a shim to determine the position of the rear face of the glass 30 which, considering the sleeve 32 alone, normally projects slightly beyond the same, as already described, a distance corresponding to the thickness of the washer. If a shim were used both it and the washer 34 should be substantially incompressible.

Ideally the glass 30 should be just flush with the inner face of the washer 28. If it were thicker and projected the glass would be put under compression before tight joints were made at the end of the sleeve with the washer and the mica against shoulder 22. Further the glass would be subject to breakage under the tightening load. On the other hand if the glass were too thin the mica would be inadequately supported thereby against the internal pressure and subject to shearing stress causing breakage. When the inner face of the glass and the outer face of the mica are in the same plane and the former supported against outward movement therefrom and there is minimum clearance at the cylindrical surface of the glass the maximum strength of the mica is obtained and is sufficient to withstand the internal pressure.

Normally the glass would first be placed in the rabbet 32 of the sleeve and if desired the washer could be placed around the glass and the end of the glass would then be flush with the upper surface of the washer 28. This assembly could then be inserted in the counterbore 26 in which the mica 28 was already housed and the sleeve screwed home. The purpose of the washer 28 is to make a bearing on which the end of the sleeve 24 may turn so that the pressure on the mica is entirely inward without imposing twisting strains on the mica. In a sense the washer 28 is a swiveled end surface for the sleeve and in this sense the glass is received in the rabbet 32 with its inner surface substantially flush with the end of the sleeve and the reference to the sleeve in the claims may be understood as including the washer if one is used and the opening of the washer as a continuation of the rabbet 32.

The drawings show the opening through the outer end of the sleeve as formed with hexagonally arranged flats to receive a plug wrench for setting up the sleeve in position. The assembled parts are then in the position seen in Fig. 2. Obviously the tightening of the parts in the assembled position is very simply accomplished, and it can be done independently of the tightening of any of the other sleeves. There is no question of uneven pressure on an elongated member. The end of the sleeve is set up in the equivalent of a metal to metal joint with the shoulder of the counterbore with the mica interposed. There are no compressive loads on the glass itself which is received entirely within the rabbet 32. The glass 30 is in effect a floating member until called upon to support the mica when the internal pressure of the boiler is exerted thereon. The only joint through which fluid could escape is along the cylindrical surface of the glass where it opposes the cylindrical wall of the rabbet. This is a small crevice which is bridged over by the mica 26 which, held as it is on the radially outer side and supported as it is on the radially inner side by the glass, is of adequate strength to resist the pressure. Its small over-all size and its circular form which gives it an inherently greater strength contribute to its capacity in this respect.

The mica elements because of their small area are far less susceptible to laminar separation under high velocity flow, such as that occurring when the boiler is blown down, than the large rectangular pieces utilized with the conventional glass. Also, their offset location with respect to the central bore of the gauge column to a great extent protects the face of the mica from the direct scouring effect during the blow-down of the gauge with resultant added increase in life. I have previously pointed out that the preferred location of the bores 18 was such that their axes were tangent to the exterior periphery of the longitudinal bore 12. As the water rises past a given bore 18 it of course enters into the same and its level is observed through a glass 30 which closes the bore. When the level sinks it is clear that the lowest point of the bore 18 intersects the bore 12 so that the water drains back to the latter and is not pocketed in one of the transverse bores.

The chamber formed from the bar of intersecting bores is of very great strength compared with an elongated slotted frame. Small discs of high grade mica are much less expensive than large pieces. The glasses 30 which may be of suitable heat resisting glass such as that known under the trade name Pyrex are available from many sources and are inexpensive, whereas the large formed rectangular glasses with the conventional gauge are not so easily procured, are highly expensive and inherently relatively fragile. Each of the closures is secured by a simple manual operation and may with the same facility be taken apart and repaired with the inexpensive replacement parts referred to entirely independently of any of the other glasses on the gauge. In the case of a conventional elongated glass, a special and gradual sequence of tightening, using a predetermined torque, as indicated by a so-called torque wrench, is necessary for successful installation of the glass without setting up debilitating localized pressures therein. If by any chance leakage shows at one of the closures 30, it is quickly obviated by mere additional tightening. None of the parts will have been damaged by the leakage, nor will there have been any damaging effect on any of the other closures.

Bull's-eyes have hitherto been secured by providing them with beveled edges with which cooperated a threaded clamping ring in a construction somewhat analogous to the screw bezel and crystal of a watch, but as applied to boiler practice this would imply a strong clamping pressure on the glass and gasketing of conventional form for each bull's-eye.

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. A gauge for high pressure liquid containers to provide for visual observation of the liquid level, comprising a body having a longitudinal bore having provision at its ends for placing the bores in communication with the gas and liquid containing spaces of the container respectively, the body having at least one series of transverse bores from a face thereof intersecting the longitudinal bore, said transverse bores each having a threaded counterbore, defining at its inner end an annular shoulder encircling the transverse bore, a threaded sleeve screwing into said counterbore against the shoulder thereof having a rabbet at its inner end opposing the shoulder, a glass freely received in the rabbet and substantially filling the same but not projecting therebeyond, and a mica disc extending across the bottom of the counterbore, marginally secured between its shoulder and the end of the sleeve and covering the inner surface of the glass.

2. A gauge as set forth in claim 1 wherein a hard washer is interposed between the end of the sleeve and the mica disc.

3. A gauge as set forth in claim 1 wherein the peripheral walls of the transverse bores are laterally offset from the center line of the longitudinal bore.

4. A gauge as set forth in claim 1 wherein the axes of the transverse bores are substantially tangent to the periphery of the longitudinal bore.

5. A gauge for high pressure liquid containers to provide for visual observation of the liquid level, comprising a body having a longitudinal bore having provision at its ends for placing the bores in communication with the gas and liquid containing spaces of the boiler respectively, the body having at least one series of transverse bores from a face thereof intersecting the longitudinal bore, said transverse bores each having a counterbore defining at its inner end an annular shoulder encircling the transverse bore, a circular disc of mica in the bottom of the counterbore, a cylindrical glass of smaller diameter than the mica resting on the same and a securing sleeve having shoulders for contact respectively, with the outer face of the glass and the margin of the mica disc which projects beyond the glass over the shoulder of the counterbore the glass having an altitude substantially equal to the distance between said shoulders of the sleeve, and individual means for securing the sleeve in an inward position against the glass and mica.

References Cited in the file of this patent

UNITED STATES PATENTS

| | | |
|---|---|---|
| 852,689 | Wolcott | May 7, 1907 |
| 1,432,024 | Homan | Oct. 17, 1922 |
| 2,603,090 | Brelsford | July 15, 1952 |

FOREIGN PATENTS

| | | |
|---|---|---|
| 7,951 | Great Britain | Apr. 27, 1893 of 1892 |
| 197,895 | Great Britain | May 24, 1923 |